Sept. 19, 1967 W. W. WHITING 3,343,120

ELECTRICAL CONNECTOR CLIP

Filed April 1, 1965

WESLEY W. WHITING
INVENTOR.

BY James D. Guinan Jr.
AGENT 3,343,120
ELECTRICAL CONNECTOR CLIP
Wesley W. Whiting, 83 Kingsbury Ave., Eugene, Oreg. 97402
Filed Apr. 1, 1965, Ser. No. 444,649
1 Claim. (Cl. 339—19)

ABSTRACT OF THE DISCLOSURE

An electrical connector clip having a dielectric body and pairs of spring fingers with the fingers of each pair being in circuit whereby the clip, when mounted on a telephone equipment mounting block, will intercept incoming telephone calls and re-route them to a recording or operator. The dielectric body is of a rounded configuration at one of its ends to facilitate rotation of the clip and the spring fingers into positive and progressive engagement with the upright terminals of the equipment block.

This invention relates to electrical connectors and more particularly to an electrical connector clip for application to the terminals of an equipment mounting block within the frame room of a telephone center for the interception of telephone calls to a discontinued telephone service.

A primary object of this invention is to provide a connector clip which when applied to the equipment mounting block terminals of a de-activated phone circuit will divert incoming calls to either an operator or to an automatic answering device. Previously, a time-consuming hand wiring operation was necessary to accomplish this result and similarly reactivation of a once disconnected phone circuit entailed the arduous and time-consuming task of unsoldering such hand wiring.

A further object of this connector clip is the provision of simple and reliable means for the interconnecting of certain phone circuits by spring biased contacts carried by the clip which permits convenient attachment as well as removal from the equipment mounting block within a telephone center.

Other objects and advantages will become apparent from a reading of the specification and claim in conjunction with the accompanying drawings in which:

Figure 1:
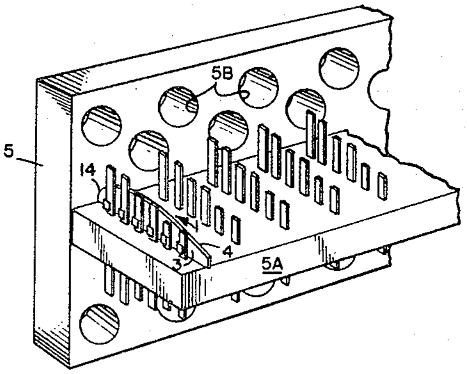
FIGURE 1 is a perspective view of an electrical connector clip in place upon a fragment of a typical equipment mounting block.

With particular reference to FIGURE 1, indicated generaly at 1 is an electrical connector clip operatively disposed and having a body portion formed from a pair of flat, thin plates 3 and 4 (FIGURE 3) of dielectric material such as a high-impact type plastic. The clip is shown in place upon an equipment mounting block 5 and engaged with the six terminals normaly carried thereby which extend perpendicularly through a horizontal dielectric part of the block indicated at 5A. The vertical portion of the mounting block is provided with a plurality of apertures 5B throughout its length for the passage therethrough of insulated telephone leads such as those indicated at 6. Each of the leads shown are secured in wrapped engagement with the lower end of their respective terminal whose upper end, in a normal phone circuit, is provided with three outgoing leads and three return leads (not shown) which connect with telephone area cable facilities and ultimately with the telephone instrument.

Figures 2, 3:
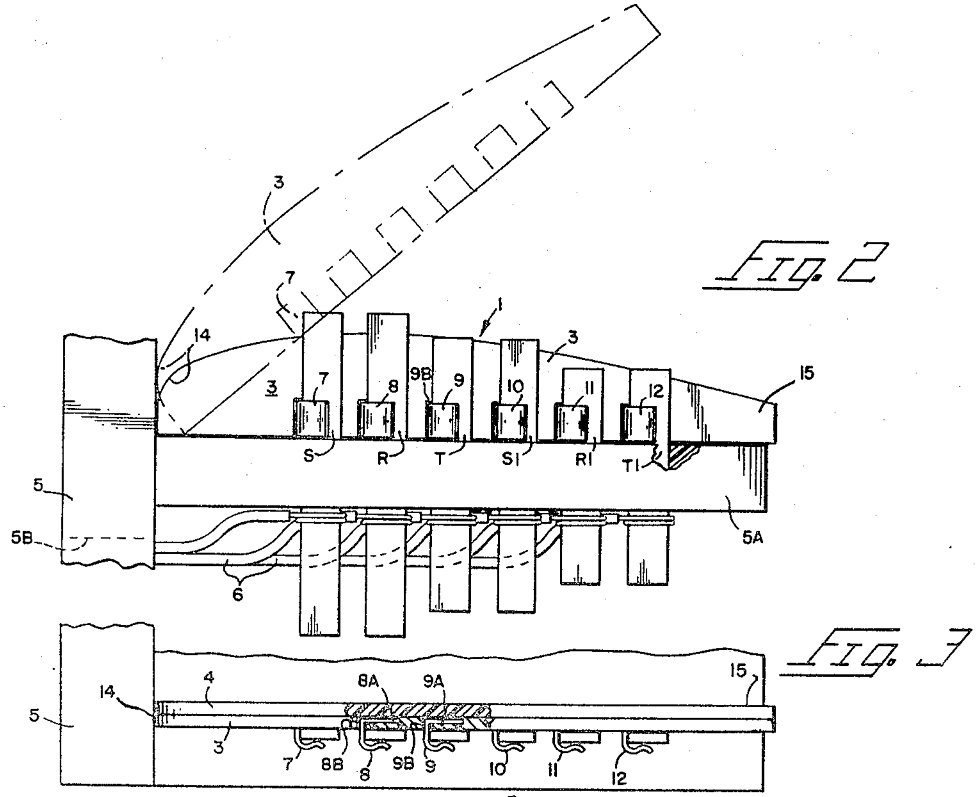
FIGURES 2 and 3 are a side elevational and top view respectively of a connector clip in place upon an equipment mounting block.
Figure 4:
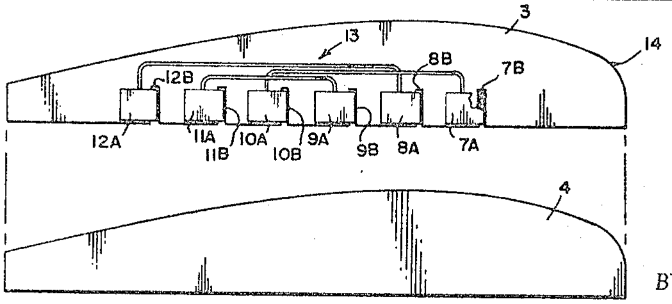
FIGURE 4 is an elevational view of the clip with parts separated to reveal inner details of construction.

The plates 3 and 4 of the interceptor connector clip are of matching configuration as shown in FIGURES 3 and 4 and are bonded to each other or otherwise secured in surfacial contact such as by an epoxy type resin adhesive. Disposed between the inner surface of the plates 3 and 4 are flanged segments 7A–12A of spring biased contacts 7–12 which extend outwardly from said flanged segments through open ended slots 7B–12B in the plate 3, and then rearwardly in a curvilinear manner. The terminal biasing portion of the finger is, in its unsprung or relaxed position, spaced from the outer surface of the plate a distance considerably less than that distance equal to the thickness of a terminal to insure positive contact therewith.

As shown in FIGURE 4, a circuit indicated generally at 13 is provided interiorly of the clip and may be comprised of a plurality of interconnecting wires as shown or alternatively strips of conductor material each of which is insulated and interconnects a pair of spring fingers. The securing of the plates 3 and 4 in juxtaposition results in the flanged segments 7A–12A as well as their interconnecting wires or strips being fixed permanently in place.

When in position on the equipment block 5, the clip is in abutment at one of its ends with the vertical part of the block. In applying the clip to the equipment mounting block it is first placed in the broken line position of FIGURE 2 with a curved end portion 14 being urged against the mounting block. Downward movement of the connector clip about its curved end portion engages the first spring finger 7 and progressively the remaining fingers 8–12. To facilitate removal of the clip from the equipment mounting block the opposite end of the clip 15 extends beyond the edge of the horizontal portion 5A of the block to provide a fingergrip for swinging the lip upwardly out of its operative or full line position shown. This manner of mounting and removing the connector clip is particularly advantageous since it permits the use of relatively stiff metal stock for the spring fingers without resulting in difficult application of the clip.

The circuit indicated generally at 13 is typical and obviously may be varied to meet the particular telephone system requirements which may include the adding of additional spring fingers for additional terminals. In a typical telephone system, the interception of an incoming call and diverting same to an operator can be accomplished by an interceptor connector clip having a circuit as shown in FIGURE 4 which connects terminals indicated at S–S1; R–T1 and T–R1 of FIGURE 2 or the clip may be provided with a circuit for diverting the call to an automatic answering device and connects the terminals S–S1; R–R1 and T–T1.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

In combination with an equipment mounting block having spaced apart terminals, a connector clip of the type described for placement upon the spaced apart terminals comprising, an elongated body portion of dielectric material extending into abutment at one of its ends with the equipment mounting block, said one end having a curved end portion terminating in abutment with the equipment mounting block when in place thereon, a plurality of longitudinally spaced spring biased contacts each having a segment secured within said body and projecting outwardly from one side thereof and being bent to form clip means for progressive engagement with their respective terminals, conductor means housed within said body portion and constituting circuits between certain pairs of contacts, and said curved end portion of said body portion formed on a radius for initial abutment with the mounting block whereby progressive engagement of said spring biased contacts is achieved by downward rotation of the clip about said curved end portion.

References Cited

UNITED STATES PATENTS

| | | | |
|---|---|---|---|
| 1,913,871 | 6/1933 | Connell et al. | |
| 2,849,700 | 8/1958 | Perkin. | |
| 2,858,372 | 10/1958 | Kaufman. | |
| 3,138,417 | 6/1964 | Garrett | 339—150 X |
| 3,155,445 | 11/1964 | Johnson | 339—150 |
| 3,181,109 | 4/1965 | Snider | 339—150 X |
| 3,188,603 | 6/1965 | Snider. | |
| 3,235,829 | 2/1966 | Haefele | 339—150 X |

MARVIN A. CHAMPION, *Primary Examiner.*

P. TEITELBAUM, *Assistant Examiner.*